No. 697,670. Patented Apr. 15, 1902.
F. SCHROTTKE.
ALTERNATING CURRENT MOTOR.
(Application filed Jan. 6, 1900.)
(No Model.)

Witnesses:
Max Zabel.
C. J. Schmidt.

Inventor:
Franz Schrottke,
By Charles A. Brown & Cragg
Attorneys.

UNITED STATES PATENT OFFICE.

FRANZ SCHROTTKE, OF BERLIN, GERMANY, ASSIGNOR TO SIEMENS & HALSKE ELECTRIC COMPANY OF AMERICA, OF CHICAGO, ILLINOIS, A CORPORATION OF ILLINOIS.

ALTERNATING-CURRENT MOTOR.

SPECIFICATION forming part of Letters Patent No. 697,670, dated April 15, 1902.

Application filed January 6, 1900. Serial No. 583. (No model.)

*To all whom it may concern:*

Be it known that I, FRANZ SCHROTTKE, a subject of the Emperor of Germany, residing at Berlin, Germany, have invented a certain new and useful Improvement in Alternating-Current Motors, (Case No. 311,) of which the following is a full, clear, concise, and exact description, reference being had to the accompanying drawings, forming a part of this specification.

My invention relates to alternating-current motors, and has primarily for its object an improved construction and arrangement of the motor so that it may be used in measuring alternating currents.

My invention consists in an improved arrangement of the windings of the motor, whereby the field due to the pressure or shunt winding of the meter may be made to differ exactly ninety degrees in phase from the series field when there is no lag in the circuit.

In accordance with my invention I provide means for producing a difference in phase between the field due to the series winding and the current, and additional means associated with the pressure-winding for modifying the magnetizing action of the pressure-winding to cause the field due to the pressure-winding to differ ninety degrees in phase from the field due to the series winding, there being no inductance in the circuit.

In the preferred embodiment of my invention I employ a supplemental conductor or conductors which are preferably in the nature of short-circuited coils associated with the main series coil, the said supplemental conductor or conductors serving to cause the field due to the main series winding to lag behind the current. A condenser is included in circuit with the shunt or pressure winding to advance the magnetic field due to the said winding ninety degrees ahead of the field due to the series winding.

I will explain my invention more fully by reference to the accompanying drawings, illustrating one embodiment thereof, in which—

Figure 1:
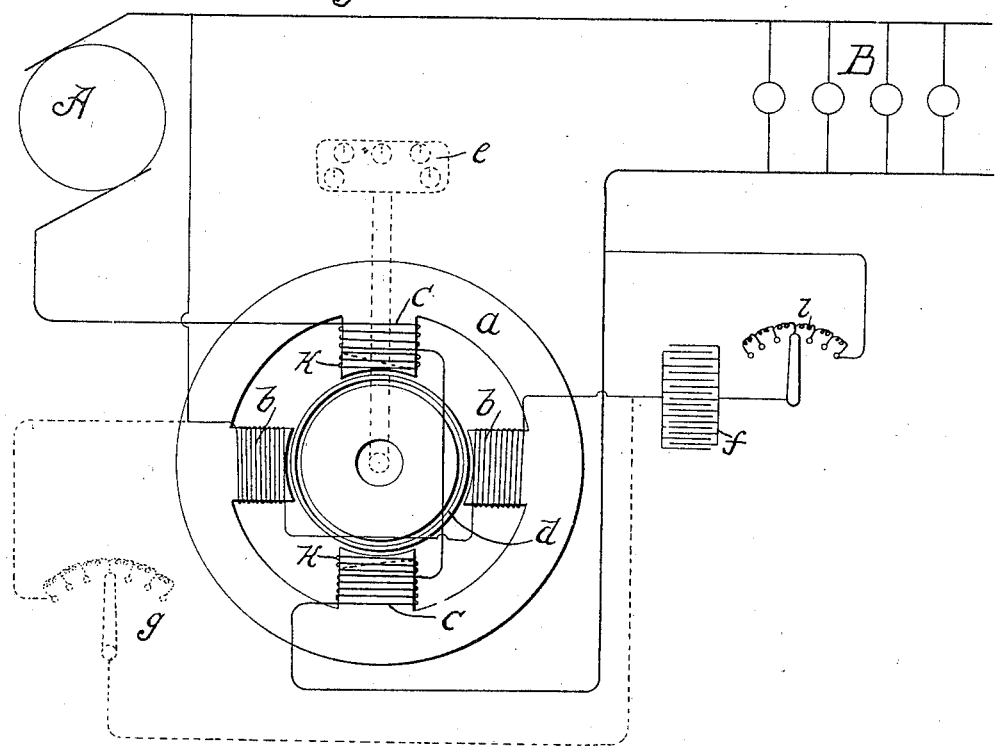
Figure 2:
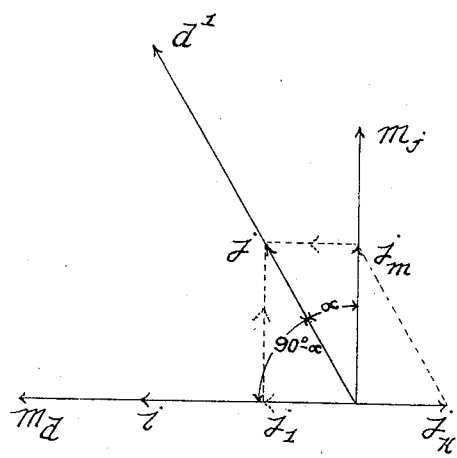

Figure 1 shows a system of alternating-current distribution, a meter constructed in accordance with my invention being connected in circuit. Fig. 2 is a vector diagram for illustrating the phenomena involved.

I have shown a single-phase generator A supplying current to translating devices B. Any suitable type of motor may be employed for the meter. I have shown a motor having an annular field $a$, provided with four inwardly and radially projecting pole-pieces, coils $b\ b$ of the shunt-winding being disposed about diametrically opposite poles, while series coils $c\ c$ are disposed about the remaining poles. An armature $d$, which may be in the form of a cylinder, is inclosed by the field-poles. The shaft of this armature actuates a suitable measuring train or indicator $e$. A condenser $f$ is connected in series with the coils $b\ b$ in the same bridge therewith. An adjusting non-inductive resistance $g$ (shown in dotted lines) may be employed, if desired, in shunt of the coils $b\ b$, more accurately initially to adjust the magnetizing effect thereof. Modifying conductors $k\ k$ are preferably associated with the series winding to modify the fields due to the series coils, one conductor being preferably associated with each series coil.

In practice I preferably form the conductors $k\ k$ as short-circuited coils, each surrounding a series pole. By the phase-modifying means associated with the series and shunt windings of the meter I am enabled to displace the fields due to these windings ninety degrees in phase. Each series coil and the supplemental conductor associated therewith may be said to constitute the coils of a transformer, the series coil being the primary of the transformer. Referring to Fig. 2, according to well-known transformer laws the current $j$ in each primary coil $c$ may be resolved into two components at right angles to each other. One component $j_m$ serves to create the series field $m_j$, while the other component $j_l$, which causes secondary current $j_k$ to be induced in the secondary coil $k$. The phase difference between the series current $j$ and the series field $m_j$ is dependent upon the amount of current $j_k$—*i. e.*, upon the turns and resistance of the secondary coil $k$.

Assuming that the displacement between the series current $j$ and the magnetizing component $j_m$ is $\alpha$ and that the current $i$ is in phase with its pressure $d'$, then it is essential, in order to have the instrument read correctly, that the field $m_d$ of the pressure-coils $b\ b$ be displaced from the main-current field $m_j$ by ninety degrees. The shunt-field-magnetizing current $i$ is advanced ahead of the pressure $d'$ by an angle of ninety degrees $-\alpha$, which advance may readily be caused by the condenser $f$. The exact adjustment of this phase displacement may be regulated by suitably choosing the resistance of the short-circuited coils $k\ k$. For practical reasons, however, it will be advantageous to include adjustable non-inductive resistance $l$ in the same bridge with the condenser and shunt-coils. This instrumentality constitutes a supplemental phase-modifying device. When there is inductance in the circuit, only that portion of the current will affect the instrument which is in phase with the pressure. My instrument is adapted to measure accurately all power factors.

My invention is of particular utility with currents of high potentials. I do not wish to be limited to the precise arrangement shown; but, Having described my invention, I claim as new and desire to secure by Letters Patent—

1. In an alternating-current system of distribution, the combination with an alternating-current generator, of transmission mains, a wattmeter for measuring the energy of said system of distribution, said meter comprising a series field-coil for creating a field varying in phase and magnitude with the current of the said system, a closed-circuited conductor associated with said series field-coil and receiving its current solely by induction for causing the phase of the field due thereto to lag with respect to the current in the system, a pressure field-winding adapted for inclusion with said system, and means for causing the phase of the field due thereto to lead with respect to the pressure of the system, whereby a phase relation of substantially ninety degrees is obtained between the series and pressure fields, substantially as described.

2. In an alternating-current system of distribution, the combination with an alternating-current generator, of transmission mains, a wattmeter for measuring the energy of said system of distribution, said meter comprising a series field-coil for creating a field varying in phase and magnitude with the current of the said system, a closed-circuited conductor associated with said series field-coil and receiving its current solely by induction for causing the phase of the field due thereto to lag with respect to the current in the system, a pressure field-winding adapted for inclusion with said system, and a condenser in series with said pressure field-winding for causing the phase of the field due thereto to lead with respect to the pressure of the system, whereby a phase relation of substantially ninety degrees is obtained between the series and pressure fields, substantially as described.

3. In an alternating-current system of distribution, the combination with an alternating-current generator, of transmission mains, a wattmeter for measuring the energy of said system of distribution, said meter comprising a series field-coil for creating a field varying in phase and magnitude with the current of the said system, a closed-circuited conductor associated with said series field-coil and receiving its current solely by induction for causing the phase of the field due thereto to lag with respect to the current in the system, a pressure field-winding adapted for inclusion with said system, a condenser in series with said pressure field-winding for causing the phase of the field due thereto to lead with respect to the pressure of the system, whereby a phase relation of substantially ninety degrees is obtained between the series and pressure fields, and an adjusting impedance $l$ in circuit with said pressure-field-winding circuit, substantially as described.

In witness whereof I hereunto subscribe my name this 28th day of November, A. D. 1899.

FRANZ SCHROTTKE.

Witnesses:
WOLDEMAR HAUPT,
WILLIAM MAYNER.